(12) United States Patent
Hirose et al.

(10) Patent No.: US 8,476,328 B2
(45) Date of Patent: *Jul. 2, 2013

(54) POLISHING PAD

(75) Inventors: Junji Hirose, Osaka (JP); Takeshi Fukuda, Osaka (JP)

(73) Assignee: Toyo Tire & Rubber Co., Ltd, Osaka-shi (JP)

( * ) Notice: Subject to any disclaimer, the term of this patent is extended or adjusted under 35 U.S.C. 154(b) by 283 days.

This patent is subject to a terminal disclaimer.

(21) Appl. No.: 12/864,819

(22) PCT Filed: Feb. 26, 2009

(86) PCT No.: PCT/JP2009/053481
§ 371 (c)(1),
(2), (4) Date: Jul. 27, 2010

(87) PCT Pub. No.: WO2009/113399
PCT Pub. Date: Sep. 17, 2009

(65) Prior Publication Data
US 2010/0317263 A1    Dec. 16, 2010

(30) Foreign Application Priority Data

Mar. 12, 2008 (JP) ................................ 2008-063034

(51) Int. Cl.
*C08G 18/00* (2006.01)
*B24B 37/00* (2012.01)

(52) U.S. Cl.
USPC ............... 521/172; 451/41; 451/56; 451/533; 451/539; 428/314.2; 428/315.5; 428/315.7; 428/131; 428/423.1; 521/170; 521/159; 521/173; 521/174

(58) Field of Classification Search
CPC ... B24B 37/24; C08G 18/4018; C08G 18/3206
USPC ............ 428/319.3, 315.5, 315.7, 314.2, 131; 451/533, 522, 41, 526, 530; 521/170, 172, 521/159, 173, 174
See application file for complete search history.

(56) References Cited

U.S. PATENT DOCUMENTS 3,049,463 A * 8/1962 Kallander et al. ............. 156/230
3,284,274 A * 11/1966 Hulslander et al. ............. 442/63
(Continued)

FOREIGN PATENT DOCUMENTS

CN    1407606    4/2003
CN    1586002    2/2005
(Continued)

OTHER PUBLICATIONS

International Search Report mailed Jun. 5, 2007, directed to International Application No. PCT/JP2007/058757; 1 page.
(Continued)

*Primary Examiner* — Joseph J Hail
*Assistant Examiner* — Marc Carlson
(74) *Attorney, Agent, or Firm* — Morrison & Foerster LLP

(57) ABSTRACT

A method for manufacturing a polishing pad that has high level of optical detection accuracy and is prevented from causing slurry leak from between the polishing region and the light-transmitting region includes preparing a cell-dispersed urethane composition by a mechanical foaming method; placing a light-transmitting region at a predetermined position on a face material or a belt conveyor, continuously discharging the cell-dispersed urethane composition onto part of the face material or the belt conveyor where the light-transmitting region is not placed; placing another face material or belt conveyor on the discharged cell-dispersed urethane composition; curing the cell-dispersed urethane composition to form a polishing region including a polyurethane foam, so that a polishing sheet is prepared; applying a coating composition containing an aliphatic and/or alicyclic polyisocyanate to one side of the polishing sheet and curing the coating composition to form water-impermeable film; and cutting the polishing sheet.

5 Claims, 1 Drawing Sheet

U.S. PATENT DOCUMENTS

| | | | | | |
|---|---|---|---|---|---|
| 4,216,177 | A | * | 8/1980 | Otto | 264/415 |
| 4,762,902 | A | * | 8/1988 | Murphy | 528/75 |
| 5,409,770 | A | * | 4/1995 | Netsu et al. | 428/310.5 |
| 5,607,982 | A | * | 3/1997 | Heyman et al. | 521/67 |
| 6,046,295 | A | * | 4/2000 | Frisch et al. | 528/28 |
| 6,099,954 | A | * | 8/2000 | Urbanavage et al. | 428/314.2 |
| 6,107,355 | A | * | 8/2000 | Horn et al. | 521/51 |
| 6,420,448 | B1 | * | 7/2002 | Hnatow et al. | 521/174 |
| 6,428,586 | B1 | * | 8/2002 | Yancey | 51/297 |
| 6,561,889 | B1 | * | 5/2003 | Xu et al. | 451/526 |
| 6,572,463 | B1 | * | 6/2003 | Xu et al. | 451/526 |
| 6,656,019 | B1 | * | 12/2003 | Chen et al. | 451/41 |
| 6,803,495 | B2 | * | 10/2004 | Simpson | 602/46 |
| 7,074,115 | B2 | * | 7/2006 | James et al. | 451/41 |
| 7,261,625 | B2 | * | 8/2007 | Hishiki | 451/526 |
| 7,291,063 | B2 | * | 11/2007 | Swisher et al. | 451/533 |
| 7,378,454 | B2 | * | 5/2008 | Masui et al. | 521/137 |
| 7,414,080 | B2 | * | 8/2008 | Kulp | 521/159 |
| 7,731,568 | B2 | * | 6/2010 | Shimomura et al. | 451/41 |
| 7,762,870 | B2 | * | 7/2010 | Ono et al. | 451/28 |
| 7,874,894 | B2 | * | 1/2011 | Fukuda et al. | 451/6 |
| 7,927,183 | B2 | * | 4/2011 | Fukuda et al. | 451/41 |
| 7,927,452 | B2 | * | 4/2011 | Hirose et al. | 156/307.1 |
| 8,094,456 | B2 | * | 1/2012 | Fukuda et al. | 361/748 |
| 8,148,441 | B2 | * | 4/2012 | Doura et al. | 521/159 |
| 8,167,690 | B2 | * | 5/2012 | Fukuda et al. | 451/533 |
| 2002/0183409 | A1 | * | 12/2002 | Seyanagi et al. | 521/155 |
| 2003/0032378 | A1 | * | 2/2003 | Ichimura et al. | 451/285 |
| 2003/0109209 | A1 | | 6/2003 | Hishiki | |
| 2003/0194963 | A1 | * | 10/2003 | Xu et al. | 451/533 |
| 2004/0024719 | A1 | * | 2/2004 | Adar et al. | 706/12 |
| 2004/0142641 | A1 | * | 7/2004 | Ohno et al. | 451/41 |
| 2004/0157985 | A1 | | 8/2004 | Masui et al. | |
| 2004/0166790 | A1 | * | 8/2004 | Balijepalli et al. | 451/526 |
| 2005/0064709 | A1 | * | 3/2005 | Shimomura et al. | 438/689 |
| 2005/0079806 | A1 | * | 4/2005 | James et al. | 451/41 |
| 2005/0112354 | A1 | * | 5/2005 | Kume et al. | 428/304.4 |
| 2005/0171224 | A1 | * | 8/2005 | Kulp | 521/155 |
| 2005/0171225 | A1 | * | 8/2005 | Kulp | 521/155 |
| 2005/0222288 | A1 | * | 10/2005 | Seyanagi et al. | 521/155 |
| 2006/0022368 | A1 | * | 2/2006 | Lee et al. | 264/51 |
| 2006/0280929 | A1 | * | 12/2006 | Shimomura et al. | 428/304.4 |
| 2006/0280930 | A1 | * | 12/2006 | Shimomura et al. | 428/304.4 |
| 2007/0275226 | A1 | * | 11/2007 | Kulp | 428/304.4 |
| 2008/0153395 | A1 | * | 6/2008 | Kulp et al. | 451/41 |
| 2008/0182492 | A1 | * | 7/2008 | Crkvenac et al. | 451/527 |
| 2008/0269369 | A1 | * | 10/2008 | van Heuman et al. | 521/159 |
| 2008/0305720 | A1 | * | 12/2008 | Hirose et al. | 451/41 |
| 2009/0011221 | A1 | * | 1/2009 | Kawaguchi et al. | 428/319.3 |
| 2009/0047872 | A1 | * | 2/2009 | Fukuda et al. | 451/41 |
| 2009/0093202 | A1 | * | 4/2009 | Fukuda et al. | 451/533 |
| 2009/0137188 | A1 | * | 5/2009 | Fukuda et al. | 451/6 |
| 2009/0137189 | A1 | * | 5/2009 | Fukuda et al. | 451/6 |
| 2009/0148687 | A1 | * | 6/2009 | Hirose et al. | 428/314.2 |
| 2009/0253353 | A1 | * | 10/2009 | Ogawa et al. | 451/41 |
| 2010/0003896 | A1 | * | 1/2010 | Nakai et al. | 451/41 |
| 2010/0009611 | A1 | * | 1/2010 | Fukuda et al. | 451/533 |
| 2010/0029182 | A1 | * | 2/2010 | Fukuda et al. | 451/41 |
| 2010/0029185 | A1 | * | 2/2010 | Fukuda et al. | 451/527 |
| 2010/0048102 | A1 | * | 2/2010 | Nakai et al. | 451/41 |
| 2010/0120249 | A1 | * | 5/2010 | Hirose et al. | 438/692 |
| 2010/0162631 | A1 | * | 7/2010 | Sato et al. | 51/295 |
| 2010/0221984 | A1 | * | 9/2010 | Doura et al. | 451/41 |
| 2010/0317263 | A1 | * | 12/2010 | Hirose et al. | 451/41 |
| 2011/0151240 | A1 | * | 6/2011 | Hirose et al. | 428/314.2 |
| 2011/0256817 | A1 | * | 10/2011 | Fukuda et al. | 451/526 |
| 2012/0108065 | A1 | * | 5/2012 | Fukuda et al. | 438/691 |
| 2012/0108149 | A1 | * | 5/2012 | Fukuda et al. | 451/41 |

FOREIGN PATENT DOCUMENTS

| | | |
|---|---|---|
| CN | 1602321 | 3/2005 |
| CN | 1625575 | 6/2005 |
| JP | 60-042431 | 3/1985 |
| JP | 61-187657 | 11/1986 |
| JP | 2-100321 | 4/1990 |
| JP | 4-159084 | 6/1992 |
| JP | 4-202215 | 7/1992 |
| JP | 5-329852 | 12/1993 |
| JP | 06-023664 | 2/1994 |
| JP | 6-262633 | 9/1994 |
| JP | 10-329005 | 12/1998 |
| JP | 11-207758 | 8/1999 |
| JP | 2000-246620 | 9/2000 |
| JP | 2001-62703 | 3/2001 |
| JP | 2002-060452 | 2/2002 |
| JP | 2002-217149 | 8/2002 |
| JP | 2002-226608 | 8/2002 |
| JP | 2002-264912 | 9/2002 |
| JP | 2002-307293 | 10/2002 |
| JP | 2002-355754 | 12/2002 |
| JP | 2003-37089 | 2/2003 |
| JP | 2003-53657 | 2/2003 |
| JP | 2003-100681 | 4/2003 |
| JP | 2003-209079 | 7/2003 |
| JP | 2003-218074 | 7/2003 |
| JP | 2003-220550 | 8/2003 |
| JP | 2003-304951 | 10/2003 |
| JP | 2004-002788 | 1/2004 |
| JP | 2004-25407 | 1/2004 |
| JP | 3490431 | 1/2004 |
| JP | 2004-42189 | 2/2004 |
| JP | 2004-42244 | 2/2004 |
| JP | 2004-87647 | 3/2004 |
| JP | 2004-119657 | 4/2004 |
| JP | 2004-169038 | 6/2004 |
| JP | 2004-188716 | 7/2004 |
| JP | 2004-193390 | 7/2004 |
| JP | 2004-524676 | 8/2004 |
| JP | 2004-291155 | 10/2004 |
| JP | 2004-335713 | 11/2004 |
| JP | 2004-337992 | 12/2004 |
| JP | 2005-1083 | 1/2005 |
| JP | 2005-34971 | 2/2005 |
| JP | 2005-68175 | 3/2005 |
| JP | 2005-131720 | 5/2005 |
| JP | 2005-153053 | 6/2005 |
| JP | 2005-330621 | 12/2005 |
| JP | 2006-502300 | 1/2006 |
| JP | 2006-35367 | 2/2006 |
| JP | 2006-75914 | 3/2006 |
| JP | 2006-222349 | 8/2006 |
| JP | 2006-519115 | 8/2006 |
| JP | 2006-231429 | 9/2006 |
| JP | 2006-255828 | 9/2006 |
| JP | 2006-265303 | 10/2006 |
| JP | 2006-297515 | 11/2006 |
| JP | 2006-334745 | 12/2006 |
| JP | 2006-339570 | 12/2006 |
| JP | 2006-342191 | 12/2006 |
| JP | 2007-112032 | 5/2007 |
| JP | 2007-283712 | 11/2007 |
| JP | 2007-307700 | 11/2007 |
| JP | 2008-31034 | 2/2008 |
| JP | 2008-156519 | 7/2008 |
| TW | I222390 | 10/2004 |
| TW | 200806431 | 2/2008 |
| WO | WO-01/96434 | 12/2001 |
| WO | WO-02/051587 | 7/2002 |
| WO | WO-03/043071 | 5/2003 |
| WO | WO-2004/054779 | 7/2004 |
| WO | WO-2005/055693 | 6/2005 |
| WO | WO-2007/010766 | 1/2007 |
| WO | WO-2007/123168 | 11/2007 |
| WO | WO-2008/026451 | 3/2008 |

OTHER PUBLICATIONS

Japanese Office Action mailed Jan. 22, 2008, directed to Japanese Application No. 2007-227773; 3 pages.

Chinese Office Action mailed Apr. 22, 2010, directed to Chinese Application No. 200780033122.9; 13 pages.

Taiwanese Office Action dated Oct. 28, 2010, directed to Taiwanese Application No. 096114786; 6 pages.

Korean Notice to Submit a Response dated Mar. 30, 2011, directed to Korean Application No. 10-2009-7004682; 6 pages.

Chinese Decision on Rejection dated Apr. 15, 2011, directed to Chinese Application No. 200780033122.9; 16 pages.
Malaysian Substantive Examination Adverse Report dated Dec. 15, 2011, directed to Malaysian Application No. PI 20080065; 3 pages.
Fukuda et al., U.S. Office Action mailed Nov. 8, 2011, directed to U.S. Appl. No. 12/439,992; 11 pages.
Hirose, J. et al., U.S. Office Action mailed Feb. 7, 2012, directed to U.S. Appl. No. 13/038,849; 11 pages.
Chinese Notification of First Office Action dated Dec. 19, 2011, directed to Chinese Application No. 200910178369.0; 21 pages.
Japanese Notification of Reasons for Refusal mailed Jan. 10, 2012, directed to Japanese Application No. 2007-006229; 6 pages.
Japanese Notification of Reasons for Refusal mailed Feb. 2, 2012, directed to Japanese Application No. 2007-006224; 6 pages.
Notification of First Office Action dated Mar. 28, 2012, directed to Chinese Application No. 201110049758.0; 13 pages.
Fukuda et al., Office Action dated Apr. 26, 2012, directed to U.S. Appl. No. 12/439,992; 11 pages.
Notification of First Office Action dated May 2, 2012, directed to Chinese Application No. 200910178370.3; 9 pages.
International Search Report mailed Jun. 2, 2009, directed to International Patent Application No. PCT/JP2009/053481; 3 pages.
Japanese Notification of Reasons for Refusal mailed Jul. 22, 2010, directed at counterpart foreign application No. JP-2008-063034; 6 pages.
International Search Report, mailed on Sep. 26, 2006, directed to International Patent Application No. PCT/JP2006/313597; 5 pages.
International Search Report mailed Jun. 5, 2007, directed to International Application No. PCT/JP2007/058758; 1 page.
International Search Report mailed Mar. 11, 2008, directed to International Application No. PCT/JP2007/072852; 4 pages.
Taiwanese Office Action dated Aug. 20, 2009, directed to Taiwanese Application No. 096114785; 9 pages.
Chinese Office Action mailed Dec. 18, 2009, directed to Chinese Patent Application No. 2006800259433; 11 pages.
Japanese Office Action mailed Jan. 22, 2010, directed to Japanese Application No. 2007-112032; 3 pages.
Korean Office Action dated Mar. 30, 2011, directed to Korean Application No. 10-2009-7004683; 7 pages.
Japanese Notification of Reasons for Refusal mailed Apr. 8, 2011 directed towards Japanese Patent Application No. 2006-072873; 6 pages.
Japanese Notification of Reasons for Refusal mailed Apr. 8, 2011 directed towards Japanese Patent Application No. 2006-072945; 6 pages.

Japanese Notification of Reasons for Refusal mailed Apr. 8, 2011 directed towards Japanese Patent Application No. 2006-072957; 6 pages.
Hirose, U.S. Office Action mailed May 4, 2010, directed to related U.S. Appl. No. 11/995,311; 9 pages.
Hirose et al., U.S. Office Action mailed Sep. 26, 2011, directed to U.S. Appl. No. 13/038,849; 11 pages.
Fukuda, T. et al., U.S. Office Action mailed Jun. 2, 2011, directed to U.S. Appl. No. 12/440,003; 7 pages.
Taiwanese Office Action mailed Sep. 7, 2011, directed to Taiwanese Application No. 096146036; 14 pages.
Fukuda, T. et al., U.S. Office Action mailed Nov. 16, 2011 directed to U.S. Appl. No. 12/519,339; 8 pages.
International Preliminary Report on Patentability mailed Nov. 28, 2006, directed to International Application No. PCT/JP2006/316699; 11 pages.
International Search Report dated Nov. 28, 2006, directed to International Application No. PCT/JP2006/316699; 4 pages.
Notification of Reasons for Refusal mailed Aug. 2, 2011, directed to Japanese Application No. 2005-249056; 4 pages.
Hirose et al., U.S. Office Action mailed Mar. 19, 2012, directed to U.S. Appl. No. 12/065,253; 10 pages.
Hirose et al., U.S. Office Action mailed Aug. 29, 2012, directed to U.S. Appl. No. 12/065,253; 10 pages.
Notification of the Second Office Action dated Oct. 12, 2012, directed to Chinese Application No. 201110049758.0; 10 pages.
Notice of Reexamination dated Oct. 12, 2012, directed to Chinese Application No. 200780033122.9; 15 pages.
Office Action dated Sep. 4, 2012, directed to Taiwanese Application No. 098106388; 8 pages.
Fukuda et al., U.S. Office Action dated Oct. 4, 2012, directed to U.S. Appl. No. 12/439,992; 9 pages.
Fukuda et al., U.S. Office Action dated Mar. 13, 2013, directed to U.S. Appl. No. 12/439,992; 11 pages.
Office Action dated Jan. 14, 2013, directed to Taiwanese Application No. 098106388; 7 pages.
Decision of Rejection dated Mar. 1, 2013, directed to CN Application No. 200910178370.3; 8 pages.
Decision of the Reexamination dated Mar. 25, 2013, directed to Chinese Application No. 200780033122.9; 26 pages.

* cited by examiner

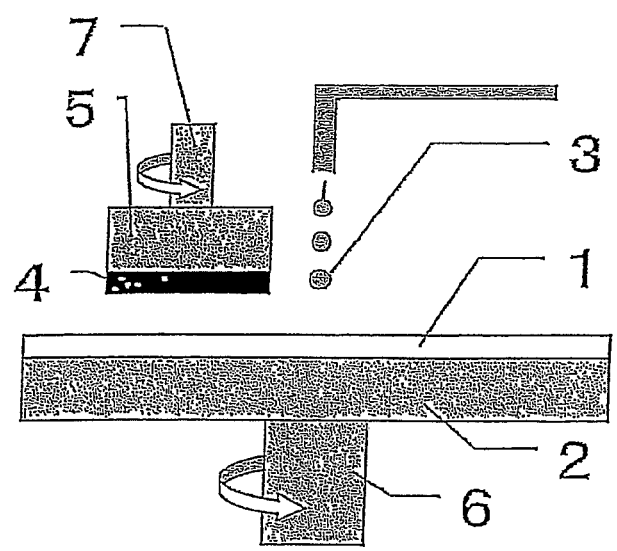

POLISHING PAD

REFERENCE TO RELATED APPLICATIONS

This application is a national stage application under 35 USC 371 of International Application No. PCT/JP2009/053481, filed Feb. 26, 2009, which claims the priority of Japanese Patent Application No. 2008-063034, filed Mar. 12, 2008, the contents of both of which prior applications are incorporated herein by reference.

FIELD OF THE INVENTION

The present invention relates to a polishing pad (for rough polishing or for final polishing), which is used upon polishing of a surface of optical materials such as lenses and reflection mirrors, a glass substrate for silicon wafers and hard disks, and an aluminum substrate. Particularly, the polishing pad of the present invention is suitably used as a polishing pad for finishing.

BACKGROUND OF THE INVENTION

Generally, the mirror polishing of semiconductor wafers such as a silicon wafer etc., lenses, and glass substrates includes rough polishing primarily intended to regulate planarity and in-plane uniformity and final polishing primarily intended to improve surface roughness and removal of scratches.

The final polishing is carried out usually by rubbing a wafer against an artificial suede made of flexible urethane foam stuck to a rotatable platen and simultaneously feeding thereon an abrasive containing a colloidal silica in an alkali-based aqueous solution (Patent Literature 1).

As the polishing pad for finishing used in final polishing, the following polishing pads have been proposed besides those described above.

A suede finishing polishing pad comprising a nap layer having a large number of long and thin holes (naps) formed with a foaming agent in the thickness direction, in polyurethane resin, and a foundation cloth for reinforcing the nap layer is proposed (Patent Literature 2).

In addition, a polishing cloth having a surface layer having a thickness of 0.2 to 2.0 mm and an elastic compressibility of 50 to 4%, an intermediate support layer laminated on the back side of the surface layer, and having a thickness of 0.2 to 2 mm and an elastic compressibility of 2 to 0.1%, and a back layer laminated on the back side of the intermediate support layer, and having a thickness of 0.15 to 2.0 mm and an elastic compressibility of 50 to 4%, is proposed (Patent Literature 3).

A suede abrasive cloth for final polishing, in which surface roughness is expressed as an arithmetic average roughness (Ra) of 5 μm or less, is proposed (Patent Literature 4).

An abrasive cloth for final polishing, which is provided with a base material part and a surface layer (nap layer) formed on the base material part, wherein a polyvinyl halide or vinyl halide copolymer is contained in the surface layer, is proposed (Patent Literature 5).

In addition, a polishing fabric obtained by impregnating a substrate with a resin solution and then heating and drying the substrate is proposed (Patent Literature 6).

In addition, a polishing fabric obtained by coating a resin solution containing a polyvinyl halide or a vinyl halide copolymer on a substrate, subjecting the substrate to wet coagulation and then heat-treating the substrate is proposed (Patent Literature 7).

Conventional polishing pads have been produced by a wet curing method. The wet curing method is a method wherein an urethane resin solution obtained by dissolving urethane resin in a water-soluble organic solvent such as dimethylformamide is applied onto a base material, then wet-solidified by treatment in water, to form a porous grain side layer, which is then washed with water and dried, followed by polishing of the grain side layer to form a surface layer (nap layer). In Patent Literature 8, for example, an abrasive cloth for finishing, having roughly spherical holes having an average particle diameter of 1 to 30 μm, is produced by the wet curing method.

However, a conventional polishing pad had problems that durability is poor and the planarizing characteristics gradually deteriorates since the pad has a structure having elongated cells, or a mechanical strength of a material itself of a surface layer is low. In addition, there was a problem that, in the conventional polishing pad, a polishing rate is stabilized with difficulty.

Patent Literature 1: JP-A 2003-37089
Patent Literature 2: JP-A 2003-100681
Patent Literature 3: JP-A 2002-307293
Patent Literature 4: JP-A 2004-291155
Patent Literature 5: JP-A 2004-335713
Patent Literature 6: JP-A 2005-330621
Patent Literature 7: JP-A 2006-255828
Patent Literature 8: JP-A 2006-75914

SUMMARY OF THE INVENTION

The present inventors made extensive study to solve the problem described above, and as a result, they found that the object can be achieved by the following polishing pad and reached completion of the present invention.

That is, the present invention relates to a polishing pad comprising a polishing layer arranged on a base material layer, wherein the polishing layer comprises a thermosetting polyurethane foam containing roughly spherical interconnected cells having an aperture, the polyurethane foam comprises an isocyanate component and an active hydrogen-containing compound as starting components, the isocyanate component contains 90% by weight or more of diphenylmethane diisocyanate and/or a modified product thereof, the active hydrogen-containing compound contains 60 to 98% by weight of polycaprolactonepolyol, and 15 to 40% by weight of a compound having the number of functional groups reactive with an isocyanate group of 3, an isocyanate group concentration relative to a total amount of the isocyanate component and the active hydrogen-containing compound is 10 to 15% by weight, and the polishing layer has the absolute value of a change rate between compressibility A in the dry condition and compressibility B in the wet condition ($\{(B-A)/A\} \times 100$) of 100 or less.

It is believed that the conventional polishing pads, upon repeated application of pressure to the polishing layer, are liable to "collapse" and are poor in durability because cells of the polishing pads have a thin and long structure or the material of the polishing layer itself is poor in mechanical strength. On the other hand, when a thermosetting polyurethane foam having roughly spherical interconnected cells having an aperture is used to form a polishing layer as described above, the durability of the polishing layer can be improved. Accordingly, when the polishing pad of the present invention is used, planarizing characteristics can be kept high for a long period of time. The term "roughly spherical" refers to sphere-shaped and oval sphere-shaped. Oval sphere-shaped cells are those having a ratio of a major axis L/minor axis S (L/S) of 5 or less, preferably 3 or less, more preferably 1.5 or less.

In addition, since the thermosetting polyurethane foam formed of the starting components, and containing roughly spherical interconnected cells having an aperture, has suitable hydrophilicity, and a slurry rapidly permeates into the interior thereof, the polishing layer in the present invention composed of the thermosetting polyurethane foam has the characteristic that the time until the polishing rate is stabilized is short (dummy polishing time is short).

In the polishing layer in the present invention, since the absolute value of the change rate between compressibility A in the dry condition and compressibility B in the wet condition ($\{(B-A)/A\}\times 100$) is 100 or less, the difference between compressibility in the dry condition and compressibility in the wet condition is small and, when wetted, compressibility is reduced with difficulty, the dummy polishing time can be shortened.

When the content of diphenylmethane diisocyanate and/or a modified product thereof in the isocyanate component is less than 90% by weight, the aggregating force of the isocyanate component forming a hard domain of the polyurethane resin is reduced, and the interconnected cell structure is formed with difficulty.

When the content of the polycaprolactonepolyol in the active hydrogen-containing compound is less than 60% by weight, or when the compound having the number of functional groups reactive with the isocyanate group of 3 in the active hydrogen-containing compound is less than 15% by weight, the difference between compressibility in the dry condition and compressibility in the wet condition becomes large, and the dummy polishing time becomes long, thus being not preferable.

On the other hand, when the content of the polycaprolactonepolyol in the active hydrogen-containing compound is more than 98% by weight, or when the compound having the number of functional groups reactive with an isocyanate group of 3 in the active hydrogen-containing compound is more than 40% by weight, fit with a slurry is deteriorated and the polishing rate is reduced because of increase in the hardness of the polishing layer, thus being not preferable.

In addition, when the concentration of the isocyanate group relative to the total amount of the isocyanate component and the active hydrogen-containing compound is less than 10% by weight, since the hardness of the polishing layer is reduced, the polishing rate is reduced and, when the concentration is more than 15% by weight, since the hardness of the polishing layer becomes too high, the polishing rate is reduced, and a scratch is easily generated in an object to be polished.

In addition, it is preferable that, in the thermosetting polyurethane foam, the weight change rate after immersion in water for 24 hours is 10% or more. When the weight change rate is less than 10%, since fit with a slurry is deteriorated, the polishing rate tends to be reduced.

It is preferable that the polishing layer is self-adhered to the base material layer. Thereby, separation of the polishing layer and the base material layer can be effectively prevented during polishing.

In addition, it is preferable that the thermosetting polyurethane foam has the interconnected cell structure having the average cell diameter of 40 to 100 μm, and the average aperture diameter of 5 to 30 μm. By adjusting the average cell diameter and the average aperture diameter in the ranges, water instantly goes throughout the polishing layer without preventing water from permeating into the polishing layer, attaining the saturated/stabilized state. In addition, slight reduction in compressibility due to swelling can be prevented by the orifice effect (resistance due to entrance and exit of a fluid into and from an interconnected hole) of water (fluid) at compression action.

The present invention also relate to a method for manufacturing a semiconductor device, which comprises a step of polishing the surface of a semiconductor wafer with the polishing pad described above.

BRIEF DESCRIPTION OF DRAWINGS

FIG. 1 is a schematic illustration showing one example of a conventional polishing apparatus used in CMP polishing.

DETAILED DESCRIPTION OF THE INVENTION

The polishing pad of the present invention comprises a polishing layer composed of a thermosetting polyurethane foam containing roughly spherical interconnected cells having an aperture (hereinafter referred to as polyurethane foam), and a base material layer. Then, the thermosetting polyurethane foam comprises an isocyanate component and an active hydrogen-containing compound as starting components, the isocyanate component contains 90% by weight or more of diphenylmethane diisocyanate and/or a modified product thereof, the active hydrogen-containing compound contains 60 to 98% by weight of polycaprolactonepolyol, and 15 to 40% by weight of a compound having the number of functions reactive with an isocyanate group of 3, and a concentration of an isocyanate group relative to the total amount of the isocyanate component and the active hydrogen-containing compound is 10 to 15% by weight.

The polyurethane resin is a preferable material for forming the polishing layer because it is excellent in abrasion resistance, a polyurethane polymer having desired physical properties can be easily obtained by changing its raw material composition, and roughly spherical fine cells can be easily formed by a mechanical foaming method (including a mechanical frothing method).

The polyurethane resin comprises an isocyanate component and an active hydrogen-containing compound (high-molecular-weight polyol, low-molecular-weight polyol, alcoholamine and chain extender etc.).

In the present invention, it is necessary to use diphenylmethane diisocyanate and/or a modified product thereof as an isocyanate component. Examples of diphenylmethane diisocyanate (MDI) include 2,2'-diphenylmethane diisocyanate, 2,4'-diphenylmethane diisocyanate, and 4,4'-diphenylmethane diisocyanate. Examples of the modified MDI include carbodiimide-modified MDI, urethane-modified MDI, allophanate-modified MDI, and buret-modified MDI.

The number of isocyanate groups of diphenylmethane diisocyanate and/or a modified product thereof is preferably 2 to 2.1.

It is necessary to use diphenylmethane diisocyanate and/or a modified product thereof at 90% by weight or more, preferably 98% by weight or more in the total isocyanate component.

As the other isocyanate component, a compound known in the field of polyurethane can be used without particular limitation. The other isocyanate component includes, for example, aromatic diisocyanates such as 2,4-toluene diisocyanate, 2,6-toluene diisocyanate, 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

In the present invention, it is necessary to use polycaprolactonepolyol as a high-molecular-weight polyol. Examples of the polycaprolactonepolyol include polycaprolactonediol, polycaprolatconetriol, and polycaprolactonetetraol. These may be used alone, or two or more kinds thereof may be used together. Particularly, it is preferable that polycaprolactonediol and polycaprolactonetriol are used. In that case, it is preferable to use polycaprolactonediol at 0.2 to 10 weight-fold relative to polycaprolactonetriol. It is necessary that polycaprolactonepolyol is used at 60 to 98% by weight, preferably 65 to 90% by weight in the total active hydrogen-containing compound. By using the specified amount of polycaprolactonepolyol, the difference between compressibility in the dry condition and compressibility in the wet condition becomes small, and suitable fit with a slurry can be imparted to the polishing layer. Additionally, it becomes easy to form an interconnected cell structure.

The number-average molecular weight of polycaprolactonepolyol is not particularly limited, but is preferably 500 to 2000, more preferably 500 to 1500 from a viewpoint of elasticity properties of polyurethane to be obtained. When the number-average molecular weight is less than 500, polyurethane using this has not sufficient elasticity properties, and easily becomes a fragile polymer. For this reason, a polishing layer made from this polyurethane foam becomes too hard, and a scratch is easily generated on a surface of an object to be polished. On the other hand, when the number-average molecular weight is more than 2000, polyurethane using this becomes too soft. Therefore, there is a tendency that the polishing layer composed of this polyurethane foam has deteriorated durability.

As the other high-molecular-weight polyol, a compound known in the field of polyurethane can be used without particular limitation. The high-molecular-weight polyol includes, for example, polyether polyols represented by polytetramethylene ether glycol and polyethylene glycol, polyester polyols represented by polybutylene adipate, polyester polycarbonate polyols exemplified by reaction products of polyester glycol such as polycaprolactone with alkylene carbonate, polyester polycarbonate polyols obtained by reacting ethylene carbonate with a multivalent alcohol and reacting the resulting reaction mixture with an organic dicarboxylic acid, polycarbonate polyols obtained by ester exchange reaction of a polyhydroxyl compound with aryl carbonate, and polymer polyols such as polyether polyol in which polymer particles are dispersed. These may be used singly or as a mixture of two or more thereof.

In addition, in the present invention, it is necessary to use a compound having the number of functional groups reactive with an isocyanate group of 3. Examples of the compound include a high-molecular-weight polyol having the number of functional groups of 3 such as polycaprolactonetriol; low-molecular-weight triol such as trimethylolpropane, glycerin, triethanolamine, and 1,2,6-hexanetriol; alcoholamine such as monoethanolamine, diethanolamine, and monopropanolamine. These may be used alone, or two or more kinds thereof may be used together. It is particularly preferable that polylcaprolactonetriol and trimethylolpropane are used. It is necessary to use the compound having the number of functional groups of 3 at 15 to 40% by weight, preferably 25 to 40% by weight in the total active hydrogen-containing compound. By using the specified amount of the compound having the number of functional groups of 3, swelling in the wet condition, and generation of scratches due to the higher hardness of the polishing layer can be suppressed. In addition, it becomes easy to form the interconnected cell structure.

In addition, low-molecular-weight components such as low-molecular-weight polyols such as ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-petanediol, diethylene glycol, triethylene glycol, 1,4-bis(2-hyroxyethoxy)benzene, pentaerythritiol, tetramethylolcyclohexane, methylglucoside, sorbitol, mannitol, dulcitol, sucrose, 2,2,6,6-tetrakis(hydroxymethyl)cyclohexanol, and N-methyldiethanolamin; low-molecular-weight polyamines such as ethylenediamine, tolylenediamine, diphenylmethanediamine, and diethylenetriamine; and alcoholamines such as 2-(2-aminoethylamino)ethanol may be used together. These low-molecular-weight components may be used alone, or two or more kinds thereof may be used together.

Among them, it is preferable to use the low-molecular-weight component having a hydroxy group value or an amine value of 1000 to 2000 mg KOH/g. A hydroxy group value or an amine value is more preferably 1000 to 1500 mg KOH/g. When a hydroxy group value or an amine value is less than 1000 mg KOH/g, there is a tendency that an effect of improving conversion into interconnected cells is not sufficiently obtained. On the other hand, when a hydroxy group value or an amine value is more than 2000 mg KOH/g, there is a tendency that a scratch is easily generated on a wafer surface. Particularly, it is preferable to use diethylene glycol, 1,2-propylene glycol, 1,3-butanediol, and 1,4-butanediol.

It is preferable to use the low-molecular-weight component at 2 to 15% by weight, preferably 2 to 12% by weight in the total active hydrogen-containing compound. By using the specified amount of the low-molecular-weight component, a cell membrane is easily broken, and not only it becomes easy to form interconnected cells, but also mechanical properties of the polyurethane foam become good.

In the case where a polyurethane foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline)(MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more.

In addition, in the present invention, it is necessary that the concentration of an isocyanate group relative to the total amount of the isocyanate component and the active hydrogen-containing compound is 10 to 15% by weight, preferably 12 to 13% by weight.

A ratio between an isocyanate component and an active hydrogen-containing compound in the invention can be altered in various ways according to molecular weights thereof, desired physical properties of polyurethane foam and the like. In order to obtain polyurethane foam with desired polishing characteristics, a ratio of the number of isocyanate groups in an isocyanate component relative to a total number of active hydrogen groups (hydroxyl groups+amino groups) in an active hydrogen-containing compound is preferably in the range of from 0.80 to 1.20 and more preferably in the range of from 0.99 to 1.15. When the number of isocyanate groups is outside the aforementioned range, there is a tendency that curing deficiency is caused, required specific gravity and hardness are not obtained, and polishing property is deteriorated.

A polyurethane resin can be produced by applying a melting method, a solution method or a known polymerization technique, among which preferable is a melting method, consideration being given to a cost, a working environment and the like.

Manufacture of a polyurethane resin is enabled by means of either a prepolymer method or a one shot method.

The isocyanate-terminated prepolymer is preferably a prepolymer having a molecular weight of about 800 to 5000 because of its excellent workability, physical properties etc.

Production of the polyurethane resin is to mix a first component containing the isocyanate-containing compound and a second component containing the active hydrogen-containing compound, and cure the mixture. In the prepolymer method, the isocyanate-terminal prepolymer is the isocyanate-containing compound, and a chain extender is the active hydrogen-containing compound. In the one shot method, the isocyanate component is the isocyanate-containing compound, and the chain extender and the polyol component (high-molecular-weight polyol, low-molecular-weight polyol, alcoholamine etc.) is the active hydrogen-containing compound.

The polyurethane foam as the material for forming the polishing layer is produced by a mechanical foaming method (including a mechanical frothing method) using a silicone-based surfactant.

Particularly, a mechanical foaming method using a silicone-based surfactant which is a copolymer of polyalkylsiloxane and polyether is preferable. As such the silicone-based surfactant, SH-192 and L-5340 (manufactured by Toray Dow Corning Silicone Co., Ltd.), B8443 (manufactured by Goldschmidt Ltd.) etc. are exemplified as a suitable compound.

The silicone-based surfactant is added to the polyurethane foam at preferably 2 to 10% by weight, more preferably 3 to 6% by weight.

Various additives may be mixed; such as a stabilizer including an antioxidant, a lubricant, a pigment, a filler, an antistatic agent and others.

Description will be given of an example of a method of producing a polyurethane foam constituting a polishing layer below. A method of manufacturing such a polyurethane foam has the following steps.

(1) The first component wherein a silicon-based surfactant is added to an isocyanate-terminated prepolymer produced by an isocyanate component with a high-molecular-weight polyol or the like is mechanically stirred in the presence of an unreactive gas, to disperse the unreactive gas as fine cells thereby forming a cell dispersion. Then, the second component containing chain extender are added to, and mixed with, the cell dispersion to prepare a cell dispersed urethane composition. If necessary, a catalyst may be added to the second component.

(2) A silicon-based surfactant is added to the first component containing an isocyanate component (or an isocyanate-terminated prepolymer) and/or the second component containing active hydrogen-containing compounds, and the component(s) to which the silicon-based surfactant is added is mechanically stirred in the presence of an unreactive gas, to disperse the unreactive gas as fine cells thereby forming a cell dispersion. Then, the remaining component is added to, and mixed with, the cell dispersion to prepare a cell dispersed urethane composition.

(3) A silicon-based surfactant is added to at least either of the first component containing an isocyanate component (or an isocyanate-terminated prepolymer) or the second component containing active hydrogen-containing compounds, and the first and second components are mechanically stirred in the presence of an unreactive gas, to disperse the unreactive gas as fine cells thereby preparing a cell dispersed urethane composition.

Alternatively, the cell dispersed urethane composition maybe prepared by a mechanical frothing method. The mechanical frothing method is a method wherein starting components are introduced into a mixing chamber, while an unreactive gas is mixed therein, and the mixture is mixed under stirring with a mixer such as an Oaks mixer thereby dispersing the unreactive gas in a fine-cell state in the starting mixture. The mechanical frothing method is a preferable method because a density of the polyurethane foam can be easily adjusted by regulating the amount of an unreactive gas mixed therein. In addition, the efficiency of production is high because the polyurethane foam having roughly spherical fine cells can be continuously formed.

The unreactive gas used for forming fine bubbles is preferably not combustible, and is specifically nitrogen, oxygen, a carbon dioxide gas, a rare gas such as helium and argon, and a mixed gas thereof, and the air dried to remove water is most preferable in respect of cost.

As a stirring device for dispersing an unreactive gas in a fine-cell state, any known stirring deices can be used without particular limitation, and specific examples include a homogenizer, a dissolver, a twin-screw planetary mixer, a mechanical froth foaming machine etc. The shape of a stirring blade of the stirring device is not particularly limited, and a whipper-type stirring blade is preferably used to form fine cells. For obtaining the intended polyurethane foam, the number of revolutions of the stirring blade is preferably 500 to 2000 rpm, more preferably 800 to 1500 rpm. The stirring time is suitably regulated depending on the intended density.

In a preferable mode, different stirring devices are used for preparing a cell dispersion in the foaming process and for stirring the first and the second components to mix them, respectively. Stirring in the mixing step may not be stirring for forming cells, and a stirring device not generating large cells is preferably used in the mixing step. Such a stirring device is preferably a planetary mixer. The same stirring device may be used in the foaming step of preparing a cell dispersion and in the mixing step of mixing the respective components, and stirring conditions such as a revolution rate of the stirring blade are preferably regulated according to necessary.

The cell dispersed urethane composition prepared by the method described above is applied onto a base material layer, and the cell dispersed urethane composition is cured to form a polyurethane foam (polishing layer) directly on the base material layer.

The base material layer is not particularly limited, and examples include a plastic film such as polypropylene, polyethylene, polyester and polyvinyl chloride, a polymer resin foam such as polyurethane foam and polyethylene foam, rubber-like resin such as butadiene rubber and isoprene rubber, and photosensitive resin. Among these materials, a plastic film such as polypropylene, polyethylene, polyester, polyamide and polyvinyl chloride and a polymer resin foam such as polyurethane foam and polyethylene foam are preferably used. A double-sided tape, or a single-sided pressure-sensitive adhesive tape (a pressure-sensitive adhesive layer on one side is stuck to a platen), may be used as the base material layer.

The base material layer preferably has hardness equal to or higher than that of the polyurethane foam in order to confer toughness on the polishing pad. The thickness of the base material layer (or the thickness of the base material in the case of a double-sided tape and a single-sided pressure-sensitive adhesive tape) is not particularly limited, but is preferably 20 to 1000 μm, more preferably 50 to 800 μm from the viewpoint of strength and flexibility.

A method of applying the cell dispersed urethane composition onto a base material layer can make use of coating methods using, for example, roll coaters such as a gravure coater, kiss-roll coater and comma coater, die coaters such as a slot coater and fountain coater, and a squeeze coater, a curtain coater etc., and any methods can be used insofar as a uniform coating film can be formed on a base material layer.

Post curing by heating the polyurethane foam formed by applying the cell dispersed urethane composition onto a base material layer and then reacting the composition until it does not flow has an effect of improving the physical properties of the polyurethane foam and is thus extremely preferable. Post curing is carried out preferably at 30 to 80° C. for 10 minutes to 6 hours and conducted preferably at normal pressures in order to stabilize the shape of cells.

In the production of the polyurethane foam, known catalysts promoting a polyurethane reaction, such as tertiary amine-based catalysts, may be used. The type and amount of the catalyst added are determined in consideration of flow time for application onto a base material layer after the step of mixing the respective components.

Production of the polyurethane foam may be carried out in a batch system wherein the respective components are weighed, introduced into a container, and mechanically stirred, or in a continuous production system wherein the respective components and an unreactive gas are continuously fed to a stirring device and mechanically stirred, and the resulting cell dispersed urethane composition is sent onto a base material layer to form a product.

In addition, it is preferable to uniformly adjust the thickness of the polyurethane foam after formation of the polyurethane foam on the base material layer or simultaneously with formation of the polyurethane foam. A method of uniformly adjusting the thickness of the polyurethane foam is not particularly limited, but examples include a method of buffing with a polishing material, a method of pressing a pressing plate, and a method of slicing with a slicer. In the case of pressing, it is preferable that the thickness of the cell dispersed urethane composition approaches a thickness of the objective polishing layer as near as possible. Specifically, a thickness of the cell dispersed urethane composition is adjusted at 80 to 100% of the thickness of an objective polishing layer. By adjusting the thickness of the cell dispersed urethane composition as thin as possible, the internal heat production at curing can be suppressed, and thereby, variation of the cell diameter can be suppressed.

In addition, the cell dispersed urethane composition prepared by the method described above is applied onto a base material layer, and a release sheet is laminated on the cell dispersed urethane composition. Thereafter, the cell dispersed urethane composition may be cured to form a polyurethane foam while the thickness thereof is made uniform with a pressing means. The method is a particularly preferable method because the thickness of the polishing layer can be regulated extremely uniformly.

On the other hand, the cell dispersed urethane composition prepared by the method described above is applied onto a release sheet, and a base material layer is laminated on the cell dispersed urethane composition. Thereafter, the cell dispersed urethane composition may be cured to form a polyurethane foam while the thickness thereof is made uniform with a pressing means. The method is a particularly preferable method because the thickness of the polishing layer can be regulated extremely uniformly.

A material for forming the release sheet is not particularly limited, and can include an ordinary resin and paper. The release sheet is preferably a sheet of less dimensional change upon heating. The surface of the release sheet may have been subjected to release treatment.

A pressing means for pressing a sandwich sheet made of the base material layer, the cell dispersed urethane composition (cell dispersed urethane layer) and the release sheet to make the thickness of the sandwich sheet uniform is not particularly limited, and for example, a method of pressing it to a predetermined thickness with a coater roll, a nip roll or the like. In considering the fact that, after compression, the size of cells in the foam is increased about 1.1 to 1.5 times, it is preferable in compression to satisfy the following equation: (Clearance of a coater or nip)−(thickness of the base material layer and release sheet)=(80 to 90% of the thickness of the polyurethane foam after curing).

After the thickness of the sandwich sheet is made uniform, the polyurethane foam is reacted until it does not flow, followed post cure. The conditions for post cure are the same as described above.

Thereafter, a release sheet on an upper surface side or a lower surface side of the polyurethane foam is separated to obtain a polishing pad. In this case, since a skin layer is formed on the polyurethane foam, the skin layer is removed by buffing, and the like. In addition, when the polyurethane foam is formed by a mechanical foaming method as described above, variation of the cells is smaller on a lower surface side than on an upper surface side of the polyurethane foam. Therefore, when a release sheet on a lower surface side is separated, and a lower surface side of the polyurethane foam is used as a polishing surface, since a polishing surface having small variation of the cells is obtained, stability of the polishing rate is more improved.

In addition, after the polishing layer is formed without forming the polyurethane foam (polishing layer) directly on the base material layer, the foam may be applied to the base material layer using a double-sided tape, and the like.

The shape of the polishing pad of the present invention is not particularly limited, but may be a long shape of around a few meters in length, or may be a round shape of a diameter of a few tens centimeters.

The average cell diameter of the polyurethane foam is preferably 40 to 100 μm, more preferably 60 to 80 μm.

The average aperture diameter of the polyurethane foam is preferably 5 to 30 μm, more preferably 20 to 30 μm.

The specific gravity of the polyurethane foam is preferably 0.2 to 0.6, more preferably 0.3 to 0.5. When the specific gravity is less than 0.2, the durability of polishing layer tends to be deteriorated. When the specific gravity is greater than 0.6, the crosslink density of the material should be lowered to attain a certain modulus of elasticity. In this case, permanent deformation tends to be increased and durability tends to be deteriorated.

The hardness of the polyurethane foam, as determined by an Asker C hardness meter, is preferably 10 to 95 degrees, more preferably 40 to 90 degrees. When the Asker C hardness is less than 10 degrees, the durability of the polishing layer is reduced, and the planarity of an object of polishing after polishing tends to be deteriorated. When the hardness is greater than 95 degrees, on the other hand, the surface of a material polished is easily scratched.

The thermosetting polyurethane foam has the weight change rate after immersion in water for 24 hours of preferably 10% or more, more preferably 12 to 30%.

The polishing layer composed of the thermosetting polyurethane foam has the absolute value of the change rate between compressibility A in the dry condition and compressibility B in the wet condition ($\{(B-A)/A\}\times 100$) of 100 or less, preferably 60 or less.

A polishing layer is preferably provided with a depression and a protrusion structure for holding and renewing a slurry. Though in a case where the polishing layer is formed with a fine foam, many openings are on a polishing surface thereof which works so as to hold the slurry, a depression and protrusion structure are preferably provided on the surface of the polishing side thereof in order to achieve more of holdability and renewal of the slurry or in order to prevent induction of dechuck error, breakage of a wafer or decrease in polishing efficiency. The shape of the depression and protrusion structure is not particularly limited insofar as slurry can be retained and renewed, and examples include latticed grooves, concentric circle-shaped grooves, through-holes, non-through-holes, polygonal prism, cylinder, spiral grooves, eccentric grooves, radial grooves, and a combination of these grooves. The groove pitch, groove width, groove thickness etc. are not particularly limited either, and are suitably determined to form grooves. These depression and protrusion structure are generally those having regularity, but the groove pitch, groove width, groove depth etc. can also be changed at each certain region to make retention and renewal of slurry desirable.

The method of forming the depression and protrusion structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

The thickness of the polishing layer is not particularly limited, but is usually about 0.2 to 2 mm, preferably 0.5 to 1.5 mm.

A polishing pad of the invention may be provided with a double sided tape on the surface of the pad adhered to a platen.

A semiconductor device is fabricated after operation in a step of polishing a surface of a semiconductor wafer with a polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a polishing pad 1, a polishing head 5 holding a semiconductor wafer 4, a backing material for applying a uniform pressure against the wafer and a supply mechanism of a polishing agent 3. The polishing pad 1 is mounted on the polishing platen 2 by adhering the pad to the platen with a double sided tape. The polishing platen 2 and the polishing head 5 are disposed so that the polishing pad 1 and the semiconductor wafer 4 supported or held by them oppositely face each other and provided with respective rotary shafts 6 and 7. A pressure mechanism for pressing the semiconductor wafer 4 to the polishing pad 1 is installed on the polishing heads side. During polishing, the semiconductor wafer 4 is polished by being pressed against the polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions and scratches on the surface of the semiconductor wafer 4 are thereby removed and polished flatly. Thereafter, a semiconductor device is produced therefrom through dicing, bonding, packaging etc. The semiconductor device is used in an arithmetic processor, a memory etc. Lenses, or glass substrates for hard disks, can also be subjected to final polishing in the same manner as described above.

EXAMPLES

Description will be given of the invention with examples, while the invention is not limited to description in the examples.
[Measurement and Evaluation Method]
(Measurement of Average Aperture Diameter and Average Cell Diameter)

The prepared polyurethane foam was cut parallel to a thickness of 1 mm or less with a razor blade as thin as possible to be used as a sample. The sample was fixed on a glass slide, and this was observed at magnification of 100 using SEM (S-3500N, Hitachi Science Systems Co., Ltd.). From the resulting image, the aperture diameter and the cell diameter of the whole continuous cells in the arbitrary range were measured using an image analyzing software (WinRoof, Mitani Corporation), and the average aperture diameter and the average cell diameter were calculated. Provided that in the case of an ellipsoidal aperture or cell, the area thereof was converted into the area of a circle, and the circle-corresponding diameter was adopted as the aperture diameter or the cell diameter.
(Measurement of Specific Gravity)

Determined according to JIS Z8807-1976. The prepared polyurethane foam cut out in the form of a strip of 4 cm×8.5 cm (thickness: arbitrary) was used as a sample for measurement of specific gravity and left for 16 hours in an environment of a temperature of 23±2° C. and a humidity of 50%±5%. Measurement was conducted by using a specific gravity hydrometer (manufactured by Sartorius Co., Ltd).
(Measurement of Hardness)

A hardness was measured in accordance with JIS K-7312. The prepared polyurethane foam was cut into samples with a size of 5 cm×5 cm (with arbitrary thickness), and the samples were left for 16 hours in an environment at a temperature of 23° C.±2° C. and humidity of 50%±5%. When measured, the samples were piled up to a thickness of 10 mm or more. A hardness meter (Asker C hardness meter, pressurized surface height 3 mm, manufactured by Kobunshi Keiki Co., Ltd.) was contacted with a pressurized surface, and 60 seconds later, the hardness was measured.
(Measurement of Weight Change Rate of Thermosetting Polyurethane Foam)

The prepared thermosetting polyurethane foam was cut into the size of 5 mm×5 mm×thickness 1 mm to obtain a sample. The sample was dried in an oven at 70° C. for 24 hours, and a weight (W1) after drying was measured. The sample after drying was immersed in pure water at 23° C. for 24 hours, thereafter, the sample taken out from water was placed into a closed container, and water was removed under the conditions of a rotation number of 10000 rpm/min using a centrifuge (KUBOTA-6800, manufactured by Kubota Corporation). Thereafter, a weight (W2) of the sample was measured.

The weight change rate (%) was calculated by the following equation.

Weight change rate(%)={(W2−W1)/W1}×100

(Measurement of Compressibility in Dry Condition, and Compressibility in Wet Condition)
1. Measurement of Compressibility in Dry Condition The thermosetting polyurethane foam cut into a circle (thickness 1 mm) with a diameter of 7 mm was allowed to stand still under the atmosphere at a temperature of 23° C. and a humidity of 50% for 40 hours. Compressibility A was measured under the following conditions using a thermal analysis measuring instrument TMA (SS6000, manufactured by SEIKO INSTRUMENTS INC.).

Compressibility A(%){(T1−T2)/T1}×100

T1: Thickness of sample when a stress of 29.4 kPa (300 g/cm$^2$) was loaded to a sample from a non-loaded state, and the sample was held for 60 seconds.
T2: Thickness of sample when a stress of 176.4 kPa (1800 g/cm$^2$) was further added from the T1 state, and the sample was held for 60 seconds.
2. Measurement of Compressibility in Wet Condition The thermosetting polyurethane foam cut into a circle (thickness 1 mm) with a diameter of 7 mm was immersed in pure water at 23° C. for 24 hours, thereafter, the sample was taken out from water, and compressibility B was measured by the same method as described above.
3. The change rate of compressibility was calculated by the following equation.

Change rate={(compressibility B−compressibility A)/compressibility A}×100

(Measurement of Dummy Polishing Time and Average Polishing Rate)

Using the prepared polishing pad, the polishing rate was measured every 10 minutes while a work was polished under the following conditions, and a time from an initial value to attainment of a steady-state value was adopted as dummy polishing time. In addition, the average polishing rate after attainment of the steady-state value was measured.
Polishing machine: BC-15, manufactured by MAT Co.
Pressure: 100 g/cm$^2$
Head speed: 50 rpm
Platen speed: 40 rpm
Slurry: cerium oxide (SHOROX F-3 manufactured by Showa Denko K.K.)/water (100 g/L)
Feed amount of slurry: 100 mL/min
Work: φ 76 0.8 t B270 (manufactured by SCHOTT DES AG)

Provided that the time point at which initial polishing rate stability (%) obtained by the following equation from the average polishing rate from (n−5) to n, and the maximum polishing rate and the minimum polishing rate of the consecutive five times polishing rates became 10% or less, was determined as the steady-state value.

Initial polishing rate stability(%)={(maximum polishing rate−minimum polishing rate)/average polishing rate}×100

Example 1

Into a container were placed 38 parts by weight of polytetramethylene ether glycol having a number-average molecular weight of 650 (PTMG650), 25 parts by weight of polycaprolactonediol (manufactured by Daisel Chemical Instrument Ltd., Plakcel 205, hydroxy group value: 208 mg KOH/g, functional group number 2), 35 parts by weight of polycaprolactonetriol (manufactured by Daisel Chemical Instrument Ltd., Plakcel 305, hydroxyl group value: 305 mg KOH/g, functional group number 3), 2 parts by weight of trimethylolpropane (hydroxyl group value: 1128 mg KOH/g, functional group number 3), 10 parts by weight of a silicone-based surfactant (manufactured by Goldshmidt, B8443), and 0.1 parts by weight of a catalyst (manufactured by Kao Corporation, No. 25), and they were mixed to prepare a second component (25° C.). Then, using a stirring blade, stirring was performed vigorously for about 4 minutes so that cells were incorporated into the reaction system at a rotation number of 900 rpm. Thereafter, 72.21 parts by weight of carboxiimide-modified MDI (manufactured by Nihon Polyurethane Industry Co., Ltd., Millionate MTL, NCO wt %: 29 wt %, 25° C.), which is a first component, was added to the container (NCO/OH=1.1), and the mixture was stirred for about 1 minute to prepare a cell dispersed urethane composition.

The prepared cell dispersed urethane composition was coated on a release-treated release sheet (manufactured by Toyobo Co., Ltd., polyethylene terephthalate, thickness: 0.1 mm) to form a cell dispersed urethane layer. Then, a base material layer (polyethylene terephthalate, thickness: 0.2 mm) was placed on the cell dispersed urethane layer. The cell dispersed urethane layer was adjusted to the thickness of 1.5 mm with a nip roll, thereafter curing this at 70° C. for 3 hours to form a polyurethane foam (interconnected cell structure, average cell diameter: 68.5 µm, average aperture diameter: 24 µm, specific gravity: 0.47, C hardness: 50 degrees). Then, the release sheet under the polyurethane foam was separated. Then, a surface of the polyurethane foam was sliced into the thickness of 0.6 mm using a bandsaw-type slicer (manufactured by Fecken Co.), and the thickness precision was adjusted by buffing to form a polishing layer having a thickness of 0.5 mm. The polyurethane foam had roughly spherical interconnected cells. Thereafter, a double-sided tape (Double Tack Tape, manufactured by Sekisui Chemical Co., Ltd.) was laminated to a base material layer surface using a laminating machine to prepare a polishing pad.

Examples 2 and 3 and Comparative Examples 1 and 2

According to the same manner as that of Example 1 except that the incorporation ratio described in Table 1 was adopted, a polishing pad was prepared. Compounds in Table 1 are as follows.
PTMG1000: polytetramethylene ether glycol with number-average molecular weight 1000
PTMG650: polytetramethylene ether glycol with number-average molecular weight 650
Plakcel 210N: polycaprolactonediol (manufactured by Daisel Chemical Instrument Ltd., hydroxy group value: 110 mg KOH/g, functional group number 2)
Plakcel 205: polycaprolactonediol (manufactured by Daisel Chemical Instrument Ltd., hydroxy group value: 208 mg KOH/g, functional group number 2)
Plakcel 305: polycaprolactonetriol (manufactured by Daisel Chemical Instrument Ltd., hydroxy group value: 305 mg KOH/g, functional group number 3)
DEG: diethylene glycol (hydroxy group value: 1057 mg KOH/g, functional group number 2)
TMP: trimethylolpropane (hydroxy group value: 1128 mg KOH/g, functional group number 3)
B8443: silicone-based surfactant (manufactured by Goldshmidt)
No. 25: catalyst (manufactured by Kao Corporation)
Millionate MTL: carbodiimide-modified MDI (manufactured by Nihon Polyurethane Industry Ltd., NCO wt %: 29 wt %)

TABLE 1

|  | Example 1 | Example 2 | Example 3 | Comparative Example 1 | Comparative Example 2 |
|---|---|---|---|---|---|
| PTMG1000 | — | — | — | — | 62.5 |
| PTMG650 | 38 | — | — | — | — |
| Plakcel 210N | — | 80 | 62.5 | 74.5 | — |
| Plakcel 205 | 25 | — | — | — | — |
| Plakcel 305 | 35 | 18 | 24.5 | 11 | 24.5 |
| DEG | — | — | 11 | 12.5 | 11 |
| TMP | 2 | 2 | 2 | 2 | 2 |
| B8443 | 10 | 6 | 10 | 6 | 4 |
| No. 25 | 0.1 | 0.1 | 0.05 | 0.1 | 0.1 |
| Millionate MTL | 72.21 | 47.71 | 80.90 | 77.46 | 80.90 |
| Isocyanate group concentration (wt %) | 12.2 | 10.0 | 13.0 | 12.7 | 13.0 |

TABLE 2

|  | Average cell diameter (μm) | Average aperture diameter (μm) | Specific gravity | C hardness (degree) | Weight change rate (%) | Compressibility (%) Dry state | Compressibility (%) Wet state | Change rate of compressibility | Dummy polishing time (min) | Average polishing rate (Å/min) |
|---|---|---|---|---|---|---|---|---|---|---|
| Example 1 | 68.5 | 24 | 0.47 | 50 | 10.9 | 5.31 | 8.39 | 58.13 | 30 | 4418 |
| Example 2 | 72 | 26.1 | 0.49 | 43 | 23.1 | 14.83 | 12.78 | −13.86 | 40 | 4555 |
| Example 3 | 78 | 29.4 | 0.46 | 61 | 14.1 | 3.86 | 7.65 | 98.18 | 40 | 4561 |
| Comparative Example 1 | 86 | 35.7 | 0.45 | 39 | 9.5 | 7.68 | 20.46 | 166.41 | 90 | 4535 |
| Comparative Example 2 | 101 | 41.5 | 0.48 | 53 | 17.0 | 4.72 | 9.52 | 101.72 | 60 | 3814 |

What is claimed is:

1. A polishing pad comprising a polishing layer provided on a base material layer, wherein the polishing layer comprises a thermosetting polyurethane foam containing roughly spherical interconnected cells having an aperture, the thermosetting polyurethane foam comprises an isocyanate component and an active hydrogen-containing compound as starting components, the isocyanate component contains 90% by weight or more of diphenylmethane diisocyanate and/or a modified product thereof, the active hydrogen-containing compound contains 60 to 98% by weight of polycaprolactone polyol, and 15 to 40% by weight of a compound having the number of functional groups reactive with an isocyanate group of 3, the isocyanate group concentration relative to the total amount of the isocyanate component and the active hydrogen-containing compound is 10 to 15% by weight, and the polishing layer has the absolute value of a change rate between compressibility A in a dry condition and compressibility B in a wet condition ($\{(B-A)/A\} \times 100$) of 100 or less, and the dry condition is defined as being held at a temperature of 23° C. and a humidity of 50% for 40 hours, and the wet condition is defined as being held in pure water at a temperature of 23° C. for 24 hours.

2. The polishing pad according to claim 1, wherein the thermosetting polyurethane foam has a weight change rate after immersion in water for 24 hours of 10% or more.

3. The polishing pad according to claim 1, wherein the polishing layer is self-adhered to the base material layer.

4. The polishing pad according to claim 1, wherein the thermosetting polyurethane foam has an interconnected cell structure having an average cell diameter of 40 to 100 μm and an average aperture diameter of 5 to 30 μm.

5. A process for producing a semiconductor device, comprising a step of polishing a surface of a semiconductor wafer using the polishing pad according to claim 1.

* * * * *